United States Patent
Hernandez Carbajal et al.

(10) Patent No.: US 10,221,349 B2
(45) Date of Patent: Mar. 5, 2019

(54) FORMULATIONS OF COPOLYMERS BASED ON ALKYL ACRYLATES USED AS DEFOAMERS OF HEAVY AND SUPER-HEAVY CRUDE OILS

(71) Applicant: INSTITUTO MEXICANO DEL PETROLEO, Mexico City (MX)

(72) Inventors: Edgar Ivan Hernandez Carbajal, Mexico City (MX); Enrique Cevada Maya, Mexico City (MX); Alfonso Lopez Ortega, Mexico City (MX); Cesar Andres Flores Sandoval, Mexico City (MX); Fernando Alvarez Ramirez, Mexico City (MX); Arquimedes Estrada Martinez, Mexico City (MX); Flavio Salvador Vazquez Moreno, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days.

(21) Appl. No.: 15/209,480

(22) Filed: Jul. 13, 2016

(65) Prior Publication Data

US 2017/0015897 A1   Jan. 19, 2017

(30) Foreign Application Priority Data

Jul. 17, 2015   (MX) .................. MX/A/2015/009234

(51) Int. Cl.
| | |
|---|---|
| *C09K 8/588* | (2006.01) |
| *C10G 29/22* | (2006.01) |
| *F15D 1/02* | (2006.01) |
| *C10G 33/04* | (2006.01) |
| *E21B 21/06* | (2006.01) |

(52) U.S. Cl.
CPC .............. *C09K 8/588* (2013.01); *C10G 29/22* (2013.01); *C10G 33/04* (2013.01); *E21B 21/068* (2013.01); *F15D 1/02* (2013.01); *C10G 2300/201* (2013.01)

(58) Field of Classification Search
CPC .... C09K 8/588; C09K 2208/06; C10G 29/22; C10G 33/04; C10G 2300/201; B01D 19/0404; F15D 1/02

See application file for complete search history.

(56) References Cited

U.S. PATENT DOCUMENTS

| | | |
|---|---|---|
| 2,702,793 A | 2/1955 | Smith et al. |
| 2,862,885 A | 12/1958 | Nelson et al. |
| 3,166,508 A | 1/1965 | Fields |
| 3,951,929 A | 4/1976 | Sweeney |
| 4,005,044 A | 1/1977 | Raleigh |
| 4,329,528 A | 5/1982 | Evans |
| 5,296,132 A | 3/1994 | Hart |
| 5,389,299 A | 2/1995 | Hart |
| 5,472,637 A | 12/1995 | Hart |
| 5,750,052 A | 5/1998 | Hart |
| 5,766,513 A | 6/1998 | Pillon et al. |
| 5,800,738 A | 9/1998 | Hart |
| 6,001,140 A | 12/1999 | Grabowski et al. |
| 7,308,938 B1 | 12/2007 | Chatterji |
| 7,517,836 B2 | 4/2009 | Chatterji |
| 7,700,527 B2 | 4/2010 | Fang et al. |
| 7,863,225 B2 | 1/2011 | Chatterji |
| 2010/0292380 A1* | 11/2010 | Martin ............... B01D 19/0404 524/314 |
| 2011/0067295 A1 | 3/2011 | Castro et al. |

FOREIGN PATENT DOCUMENTS

WO   WO 97/38067   10/1997

* cited by examiner

*Primary Examiner* — Peter D. Mulcahy
(74) *Attorney, Agent, or Firm* — Dickinson Wright PLLC

(57) ABSTRACT

This invention is directed to a method for defoaming crude oil by the addition of copolymers based on silicone free alkyl acrylics defoamers for crude oils with densities between 10 and 40° API. The alkyl acrylic copolymers at conditions similar to those of gas-liquid separators are efficient foam formation inhibitors in heavy and super-heavy crude oils to reduce foam levels between 15 and 50% faster than non-dosed crude oil. Some acrylic copolymers exhibited a greater efficiency as defoamers than commercial silicones, which promote the defoaming only 20 or 25 vol % faster than the natural foam collapse. Silicones as defoamers present serious problems as the formation of deposits and the deactivation of catalysts in the refining processes. These problems have originated a series of interdictions to use silicon based defoamers and new chemical compounds completely silicon free are required to control the foam levels in the gas/petroleum separation tanks.

21 Claims, 12 Drawing Sheets

FORMULATIONS OF COPOLYMERS BASED ON ALKYL ACRYLATES USED AS DEFOAMERS OF HEAVY AND SUPER-HEAVY CRUDE OILS

This application claims the benefit under 35 USC § 119 to Mx/a/2015/009234 filed Jul. 17, 2015, which is hereby incorporated by reference in its entirety.

TECHNICAL FIELD OF THE INVENTION

The present invention belongs to the field of chemical products to control the foam which is formed in crude oil, and in particular to silicon free antifoaming compounds. This invention corresponds to the application of copolymers based on alkyl acrylates in silicon-free formulations, to inhibit or suppress foaming in gas-liquid separation equipment for petroleum or crude oils with densities from 10 to 40° API.

BACKGROUND OF THE INVENTION

One of the main problems during the extraction and transport of crude oil is the foam formation, due to the presence of gas. In general, the greater tendency to foam formation and collapse occurs in crude oils with densities lower than 40 API degrees. Foaming, substantially, causes operational problems such as: low productivity, pump cavitation (Fallin et al, 1971), deposits formation, liquid drag into gas streams, gas and water drag into streams of crude oil and reduction in separator capacity (Wylde et al, 2008). Depending on the nature of the crude oil and the type of separators used, the foaming problems (drag of liquids into gas streams and gas entry in liquid streams) can reduce the crude oil production and even cause shutdowns of the process. The problems result in a flooding of equipment and containers, which can also cause reductions in the capacity of the gas-crude oil separators. (Poindexter et al, 2002).

A defoamer is a chemical product with surfactant properties and, when it is present in a dissolution, facilitates the foam removal. It must be insoluble in the crude oil, to provoke sudden gradients into the crude oil-gas surface tension, not be sensitive to temperature changes and be resistant against chemical compounds and oxidation attacks (Prud'homme R. et al., 1996). The crude oil or petroleum is a mixture of hydrocarbon compounds, gases and liquids. Generally, the crude oil is in liquid phase and it can also contain small amounts of sulfur, nitrogen and oxygen compounds and metal traces, (Speight J., 2001).

The inhibition of foam formation in crude oils is a multifactorial complex problem. The literature on the subject reports that an efficient antifoaming agent needs to penetrate the gas/oil and to spread over the surface of the oil (Blute et al, 1994). Among the commercial products used as defoamers for crude oils, it can be mentioned the following: silicones and fluorosilicones, phosphate esters, metal surfactants of fatty acids, sulfonated compounds, amides, polyglycols, glycol esters, polyethers, fatty acid esters and alcohols (Prod'homme et al, 1996). Among those ones, the most used are silicon-based products because of their high antifoaming ability, since these chemicals are effective at low concentrations around 10 ppm or less. However, silicon-based defoamers in massive use present problems such as catalyst poisoning in refining processes, as well as the formation of deposits in other subsequent stages.

Traditionally, silicone (dimethylpolysiloxane) was used for foam inhibition treatment. In U.S. Pat. No. 2,702,793 a mixture of dimethylsilicone and amyltriethoxysilane is employed for inhibiting foam formation in crude oils. Similarly, in U.S. Pat. No. 2,862,885 is described the use of a monovinylalkoxysilane defoamer in crude oil. In the other hand, U.S. Pat. No. 4,005,044 discloses the use of a dimethylpolysiloxane liquid as antifoaming agent in a solution of emulsifying agent.

In order to improve the performance of polysiloxanes as defoamers, some chemical modifications have been made to these polymers. A chemical modification is to obtain copolymers such as linear copolymer of fluoro-alkyl polysiloxane, as is indicated by the U.S. Pat. No. 4,329,528, with a composition between 20 to 70 mol % of fluorosilicone, presenting a great performance at high temperatures (in the range from 25 to 370° C.) and good solubility in crude oil. This copolymer is used in the crude oil reserves as a method to inhibit or suppress foaming, adding at least 1 ppm of this antifoaming agent (Evans, 1982).

International Patent WO 97/38067 and U.S. Pat. No. 6,001,140A application describe the use of copolymers, which have a structure consisting of polysiloxane and over which one is grafted an organic group, particularly a polymer with $MD_xD'_yD''_zM$ formula, where M is $O_{0.5}Si(CH_3)_3$, D is $OSi(CH_3)_2$, D' is $OSi(CH_3)R$ and D" represents $OSi(CH_3)R'$. At the same time, R is a polyhydric organic group $C_6$-$C_{28}$, while R' is a phenol derivative or an aliphatic long chain group.

Cassani F. et al. presented studies at laboratory and field level in the evaluation of six commercial silicon-based antifoaming agents in crude oils with medium density (21 to 27° API), as well as optimal dosages to control foam generated in separation equipment. Optimal dosages in a range from 0.01 to 1 ppm were found for these silicon-based antifoaming agents (formulation containing between 2 to 4 wt % of silicon in kerosene as a solvent) in a medium crude oil with 26.3° API at laboratory level. These dosages were also corroborated at field level.

Due to operational drawbacks involving silicon-based products, for some time new alternatives without silicon compounds have been sought, to evaluate them as antifoaming agents in crude oil. Such antifoaming agents called "silicon-free" are organic compounds consisting essentially of sulphates and phosphates (Hart, 1992), vegetal (Hart, 1994) and animal oils (Hart, 1995), polyisobutylene compounds (Hart, 1995 and Hart, 1998), polypropylene oxide/polyethylene oxide block copolymers (Hart, 1998) and mixtures of the previous ones.

Vegetal oils such as jojoba oil (*Simmondsia chinensis*) and animal oils such as mink oil (Neovison vison) have been used to control foam at high temperatures (150 to 500° C.) in hydrocarbon fluids during distillation and/or delayed coking processes of crude oil, as it is shown in U.S. Pat. No. 5,296,132A and U.S. Pat. No. 5,389,299A, respectively. Effective dosages as antifoaming agents in the patents cited were in the range from 10 to 1000 ppm (Hart, 1994 and 1995) and because of the low viscosity of these products, they may be added in pure form or in solution.

U.S. Pat. No. 5,472,637A and U.S. Pat. No. 5,800,738A describe the use of high molar mass polyisobutylene (between 2000 and 2 000 000 Da) and low molar mass polyisobutylene (320 Da), being efficient as defoamers in crude oil and/or derivatives of it.

In addition, alkylphenolformaldehyde alkoxylated compounds with block copolymers of propylene oxide/ethylene oxide have been developed, with molar masses between 2000 to 6000 Daltons, for foaming control in hydrocarbon hydrocracking separation systems in dosages from 15 to 1500 ppm as it is indicated in U.S. Pat. No. 5,750,052A.

In drilling or well treatments, some methods have been developed to prevent the formation or break down of foam, where the treated fluid is a liquid which is added with an antifoaming agent. According to the antifoaming agent composition this may be useful in well conditioning (drilling fluids, foundation fluids, etc.). This addition prevents foaming and air drag during stirring, mixing or pumping of those fluids. The composition of these antifoaming agents comprises a carboxylic acid amide, a propylene glycol, and a fatty alcohol ($C_{12-15}$) ethoxylated and propoxylated (Chatterji, 2007, 2009, 2011).

Rezende D. A., et al. assessed the efficiency of commercial block copolymer poly (ethylene oxide)-poly (propylene oxide) and polysiloxanes grafted polyethers antifoaming agents in two crude oil samples with similar SARA compositions (saturated, aromatics, resins and asphaltenes analysis), as well as its density and viscosity, (Danielle, 2011). Polysiloxanes grafted with polyethers like pendant groups showed the best performance as foam inhibitors in the crude oils.

Wylde J. has studied the formation of foam in crude oil from northern Alberta, Canada, with densities from 10 to 12° API. However, using the assessment method for foam formation described in his study (modification from standard ASTM D892-13 method) and due to the high viscosity of super-heavy crude oil selected to be evaluated (12° API), it was not feasible to create relevant foam levels to perform the evaluations of the antifoaming agents in study. To overcome this difficulty, a considerable amount of n-heptane was added to super-heavy crude oil, in order to create an artificial light crude oil with lower viscosity and to thus measure the foam inhibitory efficiency of the antifoaming agents. Obviously, the addition of n-heptane provokes asphaltenes loss in the crude oil. The antifoaming agents studied were all silicon-free chemicals: compounds based on sulfates and phosphates, ethoxylated esters, polyethylene-glycol esters, ethoxylated alcohols (11 commercial chemicals obtained from market). In these field assessments mixtures of sulfonated salts and ethoxylated fatty alcohol adducts with ethylene oxide and propylene oxide showed to be effective as defoamers. One limitation of this study is that the mentioned chemicals are only effective as defoamers in deasphalted crude oil and not in real heavy crude oils.

As regards on polyacrylates or acrylic compounds, there are several references to their application in the conditioning of petroleum and its derivatives. Its capacity has been reported as antifoaming agents in oil derivatives from petroleum, such as: lubricating oils for internal combustion engines, pumps lubricant oils, hydraulic oils, etc. These lubricants may be synthetic or natural, as described in U.S. Pat. No. 3,166,508. The major efficiency of polyacrylates as antifoaming agents in petroleum derivative lubricating oils is observed at concentrations from 10 to 50 ppm. However, the polyacrylates disclosed in this patent have the disadvantage of being effective only in certain types of oil. The patent to which it is referenced do not make mention of the application of polyacrylates as antifoaming agents in crude oil conditioning process. This patent does not disclose adjusting the molecular weight of the polyacrylates in order to increase their efficiency as antifoaming agents in specific samples of crude oil. U.S. Pat. No. 5,766,513 describes the combination of a fluorosilicone-based antifoaming agent with one defoamer based on polyacrylate which is effective to reduce the foam in lubricant oils at low and high temperatures. However, by themselves, none is efficient in reducing foam at same assessment conditions. In the other hand, it has been reported that copolymers based on acrylates and terpolymers based on alkyl methacrylate monomers, wherein the alkyl moiety contains a fluoroaliphatic group of 3 to 20 carbon atoms, have shown to increase the resistance to foaming once they are added to hydrocarbon lubricant oils. The copolymers and terpolymers based on acrylates are disclosed in U.S. Pat. No. 7,700,527 and EP 1029030, respectively.

Among other applications of the polyacrylates for petroleum conditioning, different to the foam formation inhibition, their use as pour point depressor in crude oils with high content in paraffinic waxes as disclosed in U.S. Pat. No. 3,951,929. Acrylics also have shown high performance as viscosity reducers in heavy crude oils, such as described in U.S. Patent Publication 2011/0067295 (Castro, 2011). Previously, it has been shown than alkyl acrylates homopolymers (polymers which contain only a single type of repeat unit) exhibited a good performance as antifoaming agents in gasified heavy and super heavy crude oil (Patent Publication MX/a/2013/014352).

REFERENCES

Cevada E., Castro L. V., Hernández E., Flores C. A., López A., Estrada A., Alvarez F. and Vazquez F. S., "Formulaciones de homopolimeros base acrilatos de alquilo empleadas como antiespumantes en aceites crudos pesados y súper pesados", Solicitud de patente mexicana MX/a/2013/014352, Dic. 6, (2013).

Castro L. V., Flores E. A., Cendejas G., Lozada M. and Vazquez F. S., "Formulations of random polymers for improving crude petroleum flow", U.S. Patent Application 20110067295A1, Mar. 24, (2011).

Estrada B. A., Cevada E., Castro L. V., Flores C., López A., Álvarez F., Estrada A. and Vázquez F., "Aparato para medir espuma", Solicitud de patente mexicana MX/a/2013/013966, Nov. 28, (2013).

Fallin S., Sharp S. P. and Wolfe J. L., "*Defoaming agents for increased oil production rates of foamy crudes*", SPE 2841, *J. Petrol. Technol.*, 23, 233-238, (1971).

Poindexter M. K., Zaki N. N., Kilpatrick P. K., Marsh S. C. and Emmons D. H., "*Factors contributing to petroleum foaming. 1. Crude oil systems*", Energy and Fuels, 16, 700-710, (2002).

Speight J. G., "*Handbook of petroleum analysis*", Wiley Interscience, U.S.A., pp 1, 61, (2001)

Blute I., Jannson M., Oh S. G. and Shah D. D., "*The molecular mechanism for destabilization of foam by organic ions*", J. Amer. Oil. Chem. Soc., 71, 41-46, (1994).

Prud'homme R. K. and Khan S. A., "*Foams, theory, measurement and applications*", Marcel Deckker Inc, New York, pp 480-493, (1996).

Smith W. R., "Foam-inhibiting and foam-inhibited compositions", U.S. Pat. No. 2,702,793, Feb. 22, (1955).

Nelson R. S., Larchmont and Charles W., "Foam inhibition in hydrocarbon oils", U.S. Pat. No. 2,862,885, Dec. 2, (1958).

Raleigh W. J., "Method of making aqueous antifoam compositions", U.S. Pat. No. 4,005,044, Jan. 25, (1977).

Evans E. R., "*Method of defoaming crude hydrocarbon stocks with fluorosilicone compounds*", U.S. Pat. No. 4,329,528, May 11, (1982).

Cassani F. and Ortega P., Intevep, S. A., Davila A. and Rodriguez W., Lagoven, S. A., and Serrano J., Corpoven, S. A. "Evaluation of Foam Inhibitors at the Jusepin Oil/Gas Separation Plant, El Furrial Field, Eastern Venezuela", Society of Petroleum Engineering, (1992).

Grabowski et al., "Diesel fuel and lubricating oil antifoaming and methods of use", U.S. Pat. No., 6,001,140A, Dec. 14, (1999).

Hart P. R., "Control of foam in hydrocarbon fluids", U.S. Pat. No. 5,169,560A, Dec. 8, (1992).

Hart P. R., "High temperature hydrocarbon defoamer composition and method", U.S. Pat. No. 5,296,132A, Mar. 22, (1994).

Hart P. R., "High temperature hydrocarbon defoamer composition and method", U.S. Pat. No. 5,389,299A, Feb. 14, (1995).

Hart P. R., "Control of foam in hydrocarbon fluids", U.S. Pat. No. 5,472,637A, Dec. 5, (1995).

Hart P. R. and Dion M. A., "Foam control method", U.S. Pat. No. 5,750,052A, May 12, (1998).

Hart P. R., "Methods for inhibiting foam in crude oils", U.S. Pat. No. 5,800,738A, Sep. 1, (1998).

Chatterji J. and King B. J., "Defoaming methods and compositions", U.S. Pat. No. 7,308,938B1, Dec. 18, (2007).

Chatterji J. and King B. J., "Defoaming methods and compositions", U.S. Pat. No. 7,517,836B2, Apr. 14, (2009).

Chatterji J. and King B. J., "Defoaming methods and compositions", U.S. Pat. No. 7,863,225B2, Jan. 4, (2011).

Rezende, D. A., Bittencour, Rafael R., Mansur, Claudia R. E., "Evaluation of the efficiency of polyether-based antifoams for crude oil", Journal of Petroleum Science and Engineering, (2011).

Wylde J. J., "Successful field application of novel non-silicone antifoam chemistries for high heavy oil storage tanks in Northern Alberta", SPE/PS-CIM/CHOA Int. Thermal Operations and heavy Oil Sym., Calgary, Alberta, Canada, (2008).

Fields J. E., "Hydrocarbon oils of reduced foaming properties", U.S. Pat. No. 3,166,508, Jan. 19, (1965).

Pillon L. Z. and Asselin E., "Antifoaming agents for lubricating oils", U.S. Pat. No. 5,766,513A, Jun. 16, (1998).

Grolitzer M. and Zhao M., "Foaming-resistant hydrocarbon oil compositions", E. P. U.S. Pat. No. 1,029,030B1, Aug. 23, (2000).

Fang J. Z. and Zhao M., "Foaming-resistant hydrocarbon oil compositions", U.S. Pat. No. 7,700,527B2, Apr. 20, (2010).

Sweeney M. W, "Polyacrylates and waxy residual fuel compositions thereof", U.S. Pat. No. 3,951,929, Apr. 20, (1976).

ASTM D-892-13, "Standard test method for foaming characteristics of lubricating oils".

ASTM D-6082-12, "Standard test method for high temperature foaming characteristics of lubricating oils.

SUMMARY OF THE INVENTION

The homopolymers have been the basis for the synthesis of these new copolymers based on alkyl acrylates. Thus, the present invention is directed to the development of new copolymers based on alkyl acrylates (polymers containing two different of repeat units) of adjusted molecular weight to the characteristics of the crude oil (petroleum) as inhibitors and suppressors of foam formation in gasified crude oil with different densities between 10 and 40° API. In another embodiment, the crude oil has a density of 12 to 22° API. In a further embodiment, the crude oil can have a density of less than 20° API. The copolymer compounds were synthesized by the process of semi-continuous emulsion polymerization described in U.S. Patent 2011/0067295 (Castro, 2011), which is hereby incorporated by reference in its entirety. This process of semi-continuous emulsion synthesis has the great advantage of using water as a dispersion medium instead of organic solvents which are expensive and harmful to the environment. Furthermore, the determinations of the foam suppressing capacity of the formulations containing the copolymers based on acrylic acid were made in gasified crude oils (crude oils containing natural gases which have been dissolved in the oil for centuries in the deposit), under conditions similar to the real conditions of the gas-liquid separator employed in the petroleum industry. Thus, Applicants rigorously demonstrate that copolymers based on alkyl acrylate have a marked efficiency as foam suppressors and foam inhibitors, in some cases even major to the silicones (more efficiently in approximately 25 vol %) used in the petroleum industry. Unlike to the silicone antifoaming agents used for foam elimination in petroleum, the acrylic compounds do not generate inorganic deposits and do not deactivate catalysts in refining processes.

Thus, applicants have developed new antifoaming agents based on alkyl acrylates, without silicon, which are a suitable replacement for foaming inhibitors based on silicone, thus providing a solution to the problems facing the production and refining of petroleum.

The invention in one embodiment is directed to a method of defoaming crude oil by the addition of a composition or formulation containing a copolymer of formula (1) as defined herein. The foam inhibiting formulation of the invention can be added directly to the crude oil as a dispersion or solution of the copolymer. The method is particularly suitable for treating gasified crude oil having a density of 10 to 40 API to reduce the foam formation by at least 20 vol % compared to crude oil that does not contain the defoaming formulation of the invention. The formulation of the invention preferably contains no water and includes the copolymer dispersed in an organic solvent or carrier.

The copolymer of the invention has the formula (1)

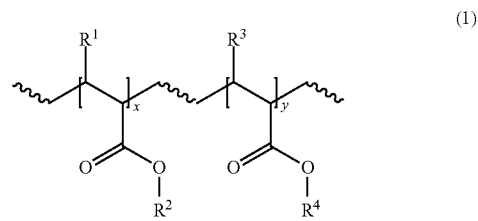

where:

$R^1$, $R^2$, $R^3$ and $R^4$ are independent radicals represented by the groups mentioned bellow:

$R^1$ and $R^3$=H (hydrogen), $CH_3$ (methyl);

$R^2$ and $R^4$=$CH_3$ (methyl), $C_2H_5$ (ethyl), $C_4H_9$ (n-butyl, isobutyl), $C_6H_{13}$ (n-hexyl, iso-hexyl), $C_8H_{17}$ (2 ethyl-hexyl), $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy)ethyl). This aliphatic chain may contain heteroatoms of the ether group, aromatic rings or rings with heteroatoms of ether type;

x=is a number between 2 and 900, preferably between 20 and 850, even more preferably 60 to 600;

y=is a number between 2 and 900 preferably between 20 and 850, even more preferably 60 to 600, and "x" and "y" vary randomly along the copolymer chain.

In the formula the wave line represents a sequence of the random distribution of monomers. In one embodiment, the monomers can be used in a monomer weight ratio of 70/30. In other embodiments, the ratio of monomers can be selected to provide particular properties and molecular weight depending on the needs of the copolymer.

The copolymers are obtained from monomers selected from the group consisting of methyl acrylate, ethyl acrylate, butyl acrylate, n-amyl acrylate, isobornyl acrylate, isobutyl acrylate, tert-butyl acrylate, hexyl acrylate, 2-ethylhexylacrylate, 3.5,5-trimethylhexyl acrylate, 2-metoxyethyl acrylate, 2-phenoxy acrylate, 4-tert-butylacyclehexyl acrylate, octyl acrylate, isodecyl acrylate, decyl acrylate, lauryl acrylate, tridecyl acrylate, octadecyl acrylate and behenyl acrylate.

BRIEF DESCRIPTION OF THE DRAWINGS OF THE INVENTION

FIG. 1 shows the performance in the chemical composition of the Co(AB-AH)-1 copolymer (AB/AH: 70/30 wt %) and the Co(AB-AH)-2 copolymer (AB/AH: 30/70 wt %), which were evaluated as antifoaming agents in gasified heavy crude oil with 15.00° API; both copolymers were dosed at 500 ppm and compared with the commercial silicon-based product IMP-Si-1.

FIG. 2 shows the performance in the chemical composition of the Co(AB-AL)-1 copolymer (AB/AL: 70/30 wt %) and the Co(AB-AL)-2 copolymer (AB/AL: 30/70 wt %), which were evaluated as antifoaming agents in gasified heavy crude oil with 15.00° API, both copolymers were dosed at 500 ppm and compared with a commercial silicon-based product IMP-Si-1.

FIG. 3 shows the performance in the chemical composition of the Co(AH-AEM)-1 copolymer (AH/AEM: 70/30 wt %) and the Co(AH-AEM)-2 copolymer (AH/AEM: 30/70 wt %), which were evaluated as antifoaming agents in gasified heavy crude oil with 15.00° API, both copolymers were dosed at 500 ppm and compared with a commercial silicon based product IMP-Si-1.

FIG. 4 shows the performance in the chemical composition of the Co(AH-AOc)-1 copolymer (AH/AOc: 30/70 wt %) and the Co(AH-AOc)-2 copolymer (AH/AOc: 70/30 wt %), which were evaluated as antifoaming agents in gasified heavy crude oil with 15.00° API, both copolymers were dosed at 500 ppm and compared with the commercial silicone-based product IMP-Si-1.

FIG. 5 shows the performance in the chemical composition of the Co(AH-AL)-1 copolymer (AH/AL: 30/70 wt %) and the Co(AH-AL)-2 copolymer (AH/AL: 70/30 wt %), which were evaluated as antifoaming agents in gasified heavy crude oil with 15.00° API, both copolymers were dosed at 500 ppm and compared with the commercial silicon-based IMP-Si-1 product.

FIG. 6 shows the performance in the chemical composition of the Co(AL-AOc)-1 copolymer (AL/AOc: 30/70 wt %) and the Co(AL-AOc)-2 copolymer (AL/AOc: 70/30 wt %), which were evaluated as antifoaming agents in gasified heavy crude oil with 15.00° API, both copolymers were dosed at 500 ppm and compared with the commercial silicon-based product IMP-Si-1.

FIG. 7 shows the performance in the chemical composition of the Co(AB-AH)-1 copolymer (AB/AH: 70/30 wt %) and the Co(AB-AH)-2 copolymer (AB/AH: 30/70 wt %), which were evaluated as antifoaming agents in gasified heavy crude oil with 15.00° API, both copolymers were dosed at 500 ppm dose and compared with the commercial silicon-based product IMP-Si-1.

FIG. 8 shows the performance in the chemical composition of the Co(AB-AL)-1 copolymer (AB/AL: 70/30 wt %) and the Co(AB-AL)-2 copolymer (AB/AL: 30/70 wt %), which were evaluated as antifoaming agents in gasified heavy crude oil with 15.00° API, both copolymers were dosed at 500 ppm and compared with the commercial silicon-based product IMP-Si-1.

FIG. 9 shows the performance in the chemical composition of the Co(AH-AEF)-1 copolymer (AH/AEF: 70/30 wt %) and the Co(AH-AEF)-2 copolymer (AH/AEF: 30/70 wt %), which were evaluated as antifoaming agents in gasified heavy crude oil with 15.00° API, both copolymers were dosed at 500 ppm and compared with the commercial silicon-based product IMP-Si-1.

FIG. 10 shows the performance of the chemical composition of the Co(AH-AOc)-1 copolymer (AH/AOc: 70/30 wt %) and the Co(AH-AOc)-2 copolymer (AH/AOc: 30/70 wt %), which were evaluated as antifoaming agents in gasified heavy crude oil with 15.00° API, both copolymers were dosed at 500 ppm and compared with the commercial silicon-based product IMP-Si-1.

FIG. 11 shows the performance in the chemical composition of the Co(AH-AL)-1 copolymer (AH/AL: 70/30 wt %) and the Co(AH-AL)-2 copolymer (AH/AL: 30/70 wt %), which were evaluated as antifoaming agents in gasified heavy crude oil with 15.00° API, both copolymers were dosed at 500 ppm and compared with the commercial silicon-based product IMP-Si-1.

FIG. 12 shows the performance in the chemical composition of the Co(AL-AOc)-1 copolymer (AL/AOc: 70/30 wt %) and the Co(AL-AOc)-2 copolymer (AL/AOc: 30/70 wt %), which were evaluated as antifoaming agents in gasified heavy crude oil with 15.00° API, both copolymers were dosed at 500 ppm and compared with the commercial silicon-based product IMP-Si-1.

DETAILED DESCRIPTION OF THE INVENTION

Figure 1:
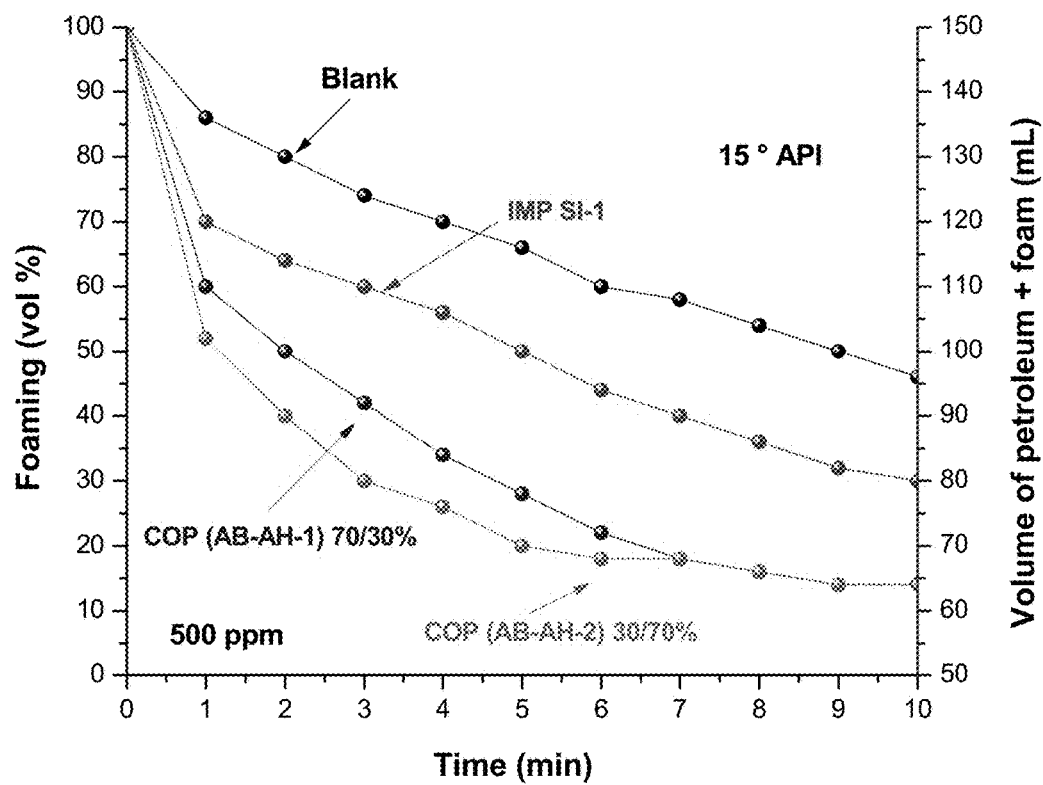
FIGS. 1 to 6 show the results of the evaluations conducted to determine the performance of these polymers based on alkyl acrylates as new antifoaming agents for gasified heavy crude oils with 15.00° API. Similarly.

The present invention relates to the synthesis of copolymers based on alkylacrylates (polymers based on random sequences of two monomers in the polymer chain) and the use as antifoaming agents of gasified heavy and super-heavy crude oils. The random copolymers based on alkyl acrylates show excellent performance as a foam inhibitor and foam suppressor in gasified crude oil. These new antifoaming agents were compared with a commercial silicon-based product IMP-Si-1 at the same concentrations. The results in Mexican patent MX/a/2013/014352 has been aided to carry out this document.

To prepare the formulation of copolymers based on alky acrylate copolymer as defoamers the following method was used. This method is illustrative and does not imply any limitation:

Copolymers based on alkyl acrylate were synthesized by semi-continuous emulsion polymerization as latex, synthesis method described in the U.S. Patent 20110067295A1 (Castro, 2011). A latex is a particle polymeric dispersion in water, easily to process by avoiding to use organic solvents. The water is distilled at temperatures between 80 to 120° C., and an organic solvent is added to obtain the formulation in order to carry out the application of the product as defoamers of gasified crude oils with densities between 10 to 40° API, using solvents having a boiling point falling within the temperature range between 35 to 200° C. The solvent can be dichloromethane, methanol, ethanol, isopropanol, chloroform, benzene and their sub-products, toluene, xylene, turbosine and naphtha, individually or mixed. The amount of copolymer in the resulting solution and formulation is between 10 and 50 wt % and more preferably between 20 and 40 wt %. The formulation can be based on two or more alkyl acrylate copolymers, or a mixture of alkyl acrylate homopolymers and copolymers.

In scheme (1) the copolymer general structure (a random combination of a couple of monomers) of the different alkyl acrylate copolymers of this invention is shown, wherein:

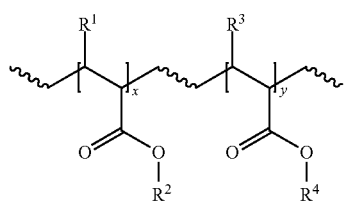

(1)

where:
$R^1$, $R^2$, $R^3$ and $R^4$ are independent radicals represented by the groups mentioned bellow:
$R^1$ and $R^3$=H (hydrogen), $CH_3$ (methyl);
$R^2$ and $R^4$=$CH_3$ (methyl), $C_2H_5$ (ethyl), $C_4H_9$ (n-butyl, isobutyl), $C_6H_{13}$ (n-hexyl, iso-hexyl), $C_8H_{17}$ (2 ethyl-hexyl), $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy)ethyl). This aliphatic chain may contain heteroatoms of the ether group, aromatic rings or rings with heteroatoms of ether type.
where "x" and "y" are numbers within the following ranges:
x=is a number from 2 to 900.
y=is a number from 2 to 900.
"x" and "y" vary randomly along the copolymer chain. In one embodiment, x can be 20 to 850 and y can be 20 to 850. In a further embodiment, x can be 60 to 600 and y can be 60 to 600.

Additionally, the molecular weights of the copolymers range from 1000 to 180 000 Daltons, preferably from 7000 to 120 000 Daltons.

The following describes by way of example, it does not imply any limitation, the monomers used in the synthesis of the copolymers object of this invention: methyl acrylate, ethyl acrylate, butyl acrylate, n-amyl acrylate, isobornyl acrylate isobutyl acrylate, tert-butyl acrylate, hexyl acrylate, 2-ethylhexyl acrylate, 3,5,5-trimethylhexyl acrylate, 2-methoxiethyl acrylate, 2-phenoxiethyl acrylate, 4-tert-butylcyclohexyl acrylate, octyl acrylate, isodecyl acrylate, decyl acrylate, lauryl acrylate, tridecyl acrylate, octadecyl acrylate or behenyl acrylate.

The method of inhibiting foam formation or defoaming crude oil includes the step of adding an effective amount of the copolymer based on alkyl acrylate to gasified crude oils with densities from 10 to 40° API, and at concentrations between 10 and 2000 ppm based on the amount of crude oil, in order to inhibit the formation of foam. The copolymer can have a molecular weight of 1000 to 180,000 Dalton. The crude oil in one embodiment contains a dissolved gas where the copolymer is added in an amount to prevent or inhibit foaming during degasification or processing of the crude oil that can cause the dissolved gas to separate from the crude oil. The defoaming agent of the invention containing the copolymer can be present is the crude oil when the crude oil is supplied or fed to the degasifying apparatus. The formulation can be combined with the crude oil in an amount of 10 to 2000 ppm based on the amount of the crude oil. In other embodiments, the formulation is combined in an amount of about 100 to 500 ppm based on the amount of crude oil. In further embodiments, the formulation is combined with the crude oil in an amount of about 200 to 1000 ppm based on the amount of crude oil.

The present invention is described in respect to specific number of examples, which are considered as illustrative and does not mean limitation. Once obtained, the copolymers based on alkyl acrylate were characterized using the following instrumental methods:

1.—Size exclusion chromatograph Agilent® model 1100, with PLgel column and using tetrahydrofuran (THF) as eluent, to calculate the copolymers molecular mass distribution and polydispersity index (I).

2.—Fourier Transform Infrared band spectrometer model Thermo Nicolet® AVATAR 330 using the method of film technique with software OMNIC® version 7.0.

Average molecular masses, polydispersity index and spectroscopic characteristics of the copolymers based on alkyl acrylate are described in Tables 1-6, which does not imply any limitation:

The data for alkyl polyacrylate identified as CO(AB-AH) wherein $R^1$=hydrogen, $R^2$=n-butyl, $R^3$=hydrogen, $R^4$=n-hexyl) are shown in Table 1, which does not mean limitation:

TABLE 1

Number average molecular mass (Mn) and polydispersity index (I) of copolymers measured by SEC.

| Copolymer | Mn (Daltons) | I |
|---|---|---|
| Co(AB-AH)-1 | 98 000 | 2.25 |
| Co(AB-AH)-2 | 112 000 | 2.03 |

The data of alkyl polyacrylate identified as CO(AH-AL) wherein $R^1$=hydrogen, $R^2$=n-butyl, $R^3$=hydrogen, $R^4$=n-lauryl) are shown in Table 2, which does not mean limitation:

TABLE 2

Number average molecular mass (Mn) and polydispersity index (I) of copolymers measured by SEC.

| Polymer | Mn (Daltons) | I |
|---|---|---|
| Co(AB-AL)-1 | 80 000 | 1.52 |
| Co(AB-AL)-2 | 103 640 | 1.89 |

The data for alkyl polyacrylate wherein$R^1$=hydrogen, $R^2$=n-hexyl, $R^3$=hydrogen, $R^4$=phenoxyethyl) identified as CO(AH-AEF) are shown in Table No. 3, which does not imply any limitation:

TABLE 3

Number average molecular mass (Mn) and polydispersity index (I) of copolymers measured by SEC.

| Copolymer | Mn (Daltons) | I |
|---|---|---|
| Co(AH-AEF)-1 | 126 100 | 2.45 |
| Co(AH-AEF)-2 | 138 700 | 2.64 |

In Table 4 is shown the results for alkyl polyacrylate wherein $R^1$=hydrogen, $R^2$=n-hexyl, $R^3$=hydrogen, $R^4$=n-octyl) identified as CO(AH-AOc), which does not mean limitation:

TABLE 4

Number average molecular mass (Mn) and polydispersity index (I) of copolymers measured by SEC.

| Copolymer | Mn (Daltons) | I |
|---|---|---|
| CoAH-AOc)-1 | 124 500 | 1.98 |
| Co(AH-AOc)-2 | 102 340 | 2.06 |

In Table No. 5 is shown the data for alkyl polyacrylate wherein $R^1$=hydrogen, $R^2$=n-hexyl, $R^3$=hydrogen, $R^4$=n-lauryl) identified as Co(AH-AL), which does not mean limitation:

TABLE 5

Number average molecular mass (Mn) and polydispersity index (I) of copolymers measured by SEC.

| Copolymer | Mn (Daltons) | I |
|---|---|---|
| Co(AH-AL)-1 | 89 700 | 2.83 |
| Co(AH-AL)-2 | 98 800 | 2.64 |

In Table No. 6 is shown the data for alkyl polyacrylate wherein $R^1$=hydrogen, $R^2$=n-lauryl, $R^3$=hydrogen, $R^4$=n-octyl) identified as Co(AL-AOc), which does not mean limitation:

TABLE 6

Number average molecular mass (Mn) and polydispersity index (I) of copolymers measured by SEC

| Copolymer | Mn (Daltons) | I |
|---|---|---|
| AL-AOc-1 | 149 700 | 1.93 |
| AL-AOc-2 | 130 800 | 2.64 |

EXAMPLES

The following examples are presented to illustrate the spectroscopic characteristic of the copolymers based on alkyl acrylate and their application as defoamer agents in gasified crude oils with API densities between 10 to 40° API. These examples should not be regarded as limiting what is claimed.

Co(AB-AH)-1

I.R. n $cm^{-1}$: 2958, 2929, 2866, 1736, 1463, 1383, 1258, 1166.

Co(AB-AH)-2

I.R. n $cm^{-1}$: 2960, 2931, 2864, 1735, 1464, 1384, 1259, 1167.

Co(AB-AL)-1

I.R. n $cm^{-1}$: 2955, 2926, 2853, 1734, 1462, 1395, 1257, 1196, 716.

Co(AB-AL)-2

I.R. n $cm^{-1}$: 2954, 2926, 2852, 1734, 1463, 1395, 1257, 1198, 714.

Co(AH-AEF)-1

I.R. n $cm^{-1}$: 3035, 2948, 2924, 2875, 1726, 1600, 1498, 1402, 1268, 1188, 722.

Co(AH-AEF)-2

I.R. n $cm^{-1}$: 3035, 2942, 2926, 2875, 1726, 1600, 1498, 1402, 1269, 1189, 724.

Co(AH-AOc)-1

I.R. n $cm^{-1}$: 2961, 2931, 2854, 1736, 1467, 1391, 1253, 1185, 730.

Co(AH-AOc)-2

I.R. n $cm^{-1}$: 2962, 2930, 2852, 1736, 1468, 1382, 1254, 1183, 730.

Co(AH-AL)-1

I.R. n $cm^{-1}$: 2972, 2932, 2851, 1732, 1447, 1393, 1249, 1174, 729.

Co(AH-AL)-2

I.R. n $cm^{-1}$: 2970, 2934, 2853, 1732, 1448, 1390, 1249, 1178, 729.

Co(AL-AOc)-1

I.R. n $cm^{-1}$: 2960, 2933, 2850, 1730, 1462, 1394, 1247, 1168, 724.

Co(AL-AOc)-2

I.R. n $cm^{-1}$: 2962, 2931, 2853, 1730, 1464, 1396, 1247, 1170, 722.

Evaluation of Polymers as Anti-Foaming Agents in Heavy Crude Oil and Super-Heavy Crude oils, used in evaluations of the defoamers, are contained in a metal stainless steel vessel with a capacity of 4 liters; oil samples were extracted from the well to the sampling conditions at 76.5° C. and a pressure of 6 kg/cm².

Copolymers based on alkyl acrylates were evaluated as foam inhibitors in gasified heavy and super-heavy crude oils, using an apparatus for measuring the foam and an assessment procedure implemented by the applicants (Mexican patent MX/a/2013/013966). The metallic vessel containing the crude oil was instrumented with a nitrogen gas supply line, heating jackets and a vent line for the crude oil, where the defoaming agents are fed. The foaming process is induced by preheating the stainless steel vessel at an external temperature in a range from 40 to 150° C., and pressurizing the system with nitrogen gas at a pressure in a range from 80 to 150 psi, remaining at these conditions for two hours before starting the test. After annealing the metal vessel, the crude oil is released using the starting line or exhaust, the defoamer is fed into the outlet pipe through a septum-type connection (diaphragm made of a material which allows entry of a needle and when being extracted can seal the pipe) by using a syringe to a desired dosage from 10 to 2000 ppm. The foam is formed due to the sudden pressure drop of the pressurized oil in the metal container with respect to external atmospheric pressure.

150 mL of crude oil are released from the metallic vessel with formed foam, being poured into a graduated glass cylinder in approximately during 20 to 40 s. The foam collapse is measured, recording the volumes registered in the graduated glass cylinder every minute for a period of 10 min. Finally, once the test is finished, the crude oil stand in the graduated cylinder until there is no more foam and the residual crude oil is measured.

Gasified heavy and super-heavy crude oils were characterized as follows:

TABLE 5

Physical and physico-chemical characterization of crude oils

| Property | Heavy crude oil | Super-heavy crude oil |
|---|---|---|
| °API | 15.00 | 12.84 |
| Salt content (lbs./1000 bbl) | 49.54 | 11.48 |
| Paraffin content (wt %) | 4.32 | 4.75 |
| Temperature runoff (° C.) | −12 | −3 |
| Kinematic viscosity (mm$^2$/s) @ 25° C. | 2309.52 | 3423.58 |
| Cryoscopy MW (g/mol) | 398.00 | 426.44 |
| n-heptane insolubles (wt %) | 10.45 | 16.58 |
| SARA analysis | | |
| Saturates (wt %) | 6.06 | 10.28 |
| Aromatics (wt %) | 5.95 | 26.65 |
| Resins (wt %) | 71.71 | 45.79 |
| Asphaltenes (wt %) | 16.22 | 17.25 |

Different concentrates of each copolymer were prepared, from 5 to 40 wt %, using solvents with a boiling point in the range from 35 to 200° C., wherein the solvent is dichloromethane, methanol, ethanol, isopropanol, chloroform, benzene, toluene, xylene, jet fuel, naphtha, individually or in mixtures thereof, so small volumes of solution were added in order to stablish that there is no effect of solvent on the foam breaking. The polymers based on alkyl acrylates were evaluated at concentrations in the interval from 10 to 2000 ppm based on the amount of crude oil. The influence of the polymers based on alkyl acrylates was evaluated simultaneously—in order to stablish a comparison—with a silicon based commercial defoamer.

a. By way of demonstration, which does not imply any limitation, FIGS. 1, 2, 3, 4, 5 and 6 show the results of evaluations of Co(AB-AH)-1, Co(AB-AH)-2, Co(AB-AL)-1, Co(AB-AL)-2, Co(AH-AEF)-1, Co(AH-AEF)-2, Co(AH-AOc)-1, Co(AH-AOc)-2, Co(AH-AL)-1, Co(AH-AL)-2, Co(AL-AOc)-1 and Co(AL-AOc)-2 copolymers as antifoam agents in gasified heavy crude oil (° API=15.00), dosed at 500 ppm; however, these copolymers have been applied from 10 to 2000 ppm. The commercial silicon-based product IMP-SI-1 brings down the foam level 20 vol % faster than that of the blank at a dose of 500 ppm.

FIGS. 7, 8, 9, 10, 11 and 12 show the results of the evaluations of Co(AB-AH)-1, Co(AB-AH)-2, Co(AB-AL)-1, Co(AB-AL)-2, Co(AH-AEF)-1, Co(AH-AEF)-2, Co(AH-AOc)-1, Co(AH-AOc)-2, Co(AH-AL)-1, Co(AH-AL)-2, Co(AL-AOc)-1 and CO(AL-AOc)-2 copolymers as antifoaming agents in gasified super-heavy crude oil (° API=12.84) dosed at 500 ppm; however, these copolymers have been applied from 10 to 2000 ppm. The commercial silicon-based product IMP-SI-1 decreases the foam 20 vol % faster than the blank in a dose of 500 ppm. The efficiency of the copolymer based on alkyl acrylates is compared with the blank.

FIG. 1 shows that the Co(AB-AH)-1 and Co(AB-AH)-2 copolymers are efficient as foam inhibitors, regardless of the proportion of AB in respect to AH, provoking a decrease of the foam between 30 to 40 vol % faster than the blank, and even above the defoaming efficiency of the commercial silicon-based product IMP-SI-1, dosed at 500 ppm.

Figure 2:
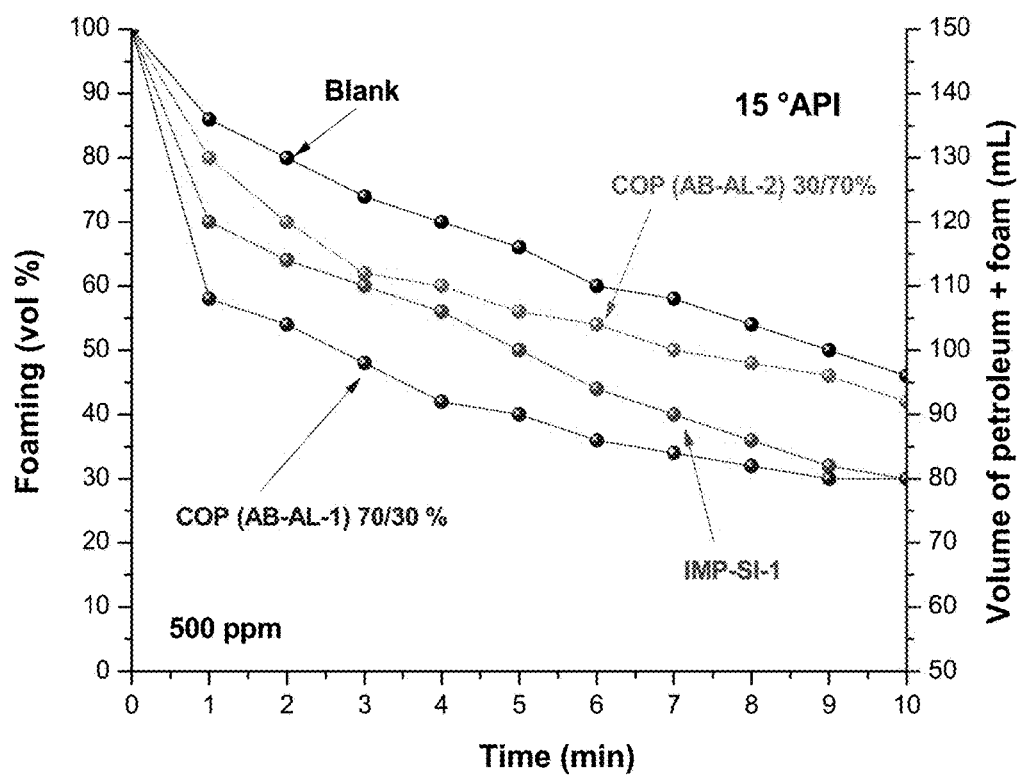

FIG. 2 shows that the Co(AB-AL)-1 copolymer (AB/AL: 70/30 wt %), dosed at 500 ppm, is slightly more efficient as defoamer compared with the commercial silicone-based product IMP-SI-1 at same dosage, decreasing the foam level between 20 to 25 vol % faster than the blank. Regarding the Co(AB-AL)-2 copolymer (AB/AL: 30/70 wt %) dosed at 500 ppm, the foam is reduced between 5 to 10 vol % compared with the blank. Therefore, the defoaming efficiency is favored with a higher amount of AB monomer (70 wt %) in the copolymer.

Figure 3:
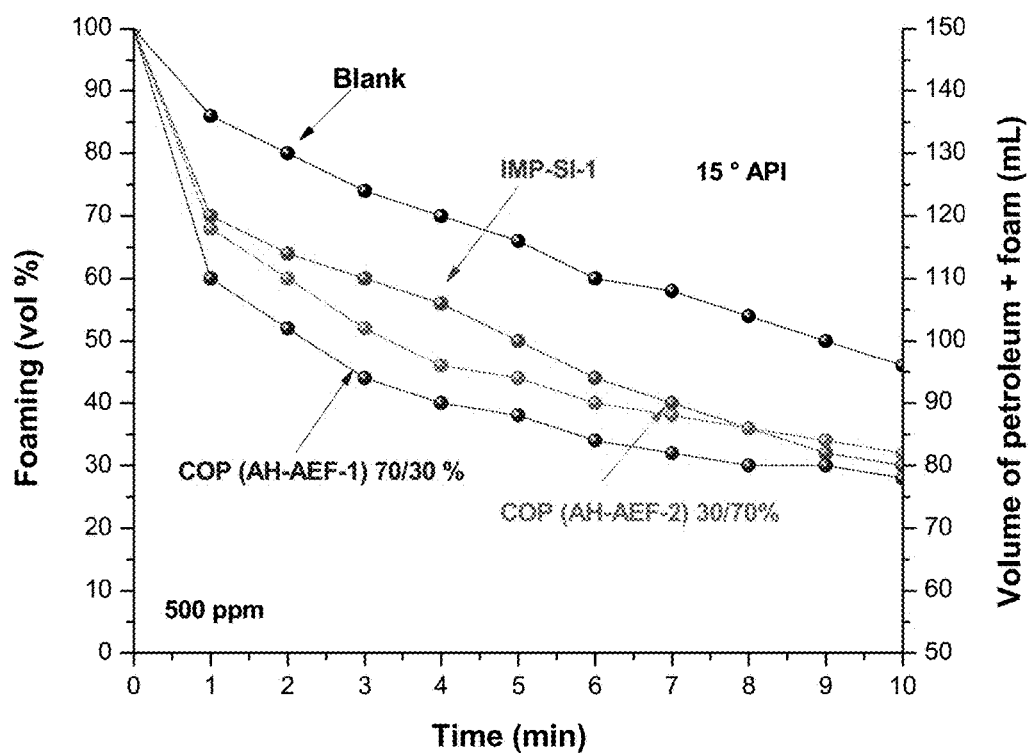

FIG. 3 shows that the Co(AH-AEF)-1 copolymer (AH/AEF: 70/30 wt %) is the most efficient as defoamer agent, abating the foam between 30 to 40 vol % compared with the blank. On the other hand, the Co(AH-AEF)-2 copolymer (AH/AEF: 30/70 wt %) behaves as the commercial silicone-based product IMP-SI-1 inhibiting the foam between 20 to 25 vol %, faster than the blank. Thus, increasing the amount of AH monomer, the efficiency of the copolymer as defoamer is improved.

Figure 4:
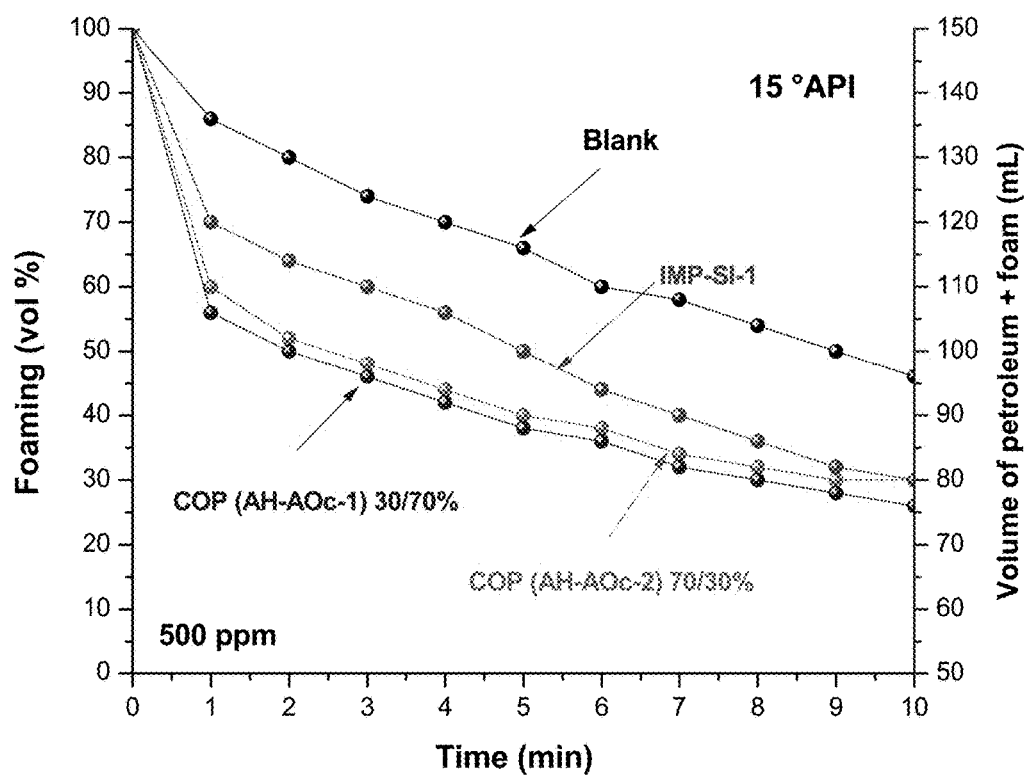

FIG. 4 shows that the Co(AH-AOc)-1 and Co(HA-AOC)-2 copolymers, regardless of the monomer ratio, both show a similar behavior as defoamer at a dose of 500 ppm, being the defoaming efficiency slightly higher than the commercial silicon-based product IMP-SI-1, abating the foam between 25 to 30 vol % relative to the blank.

Figure 5:
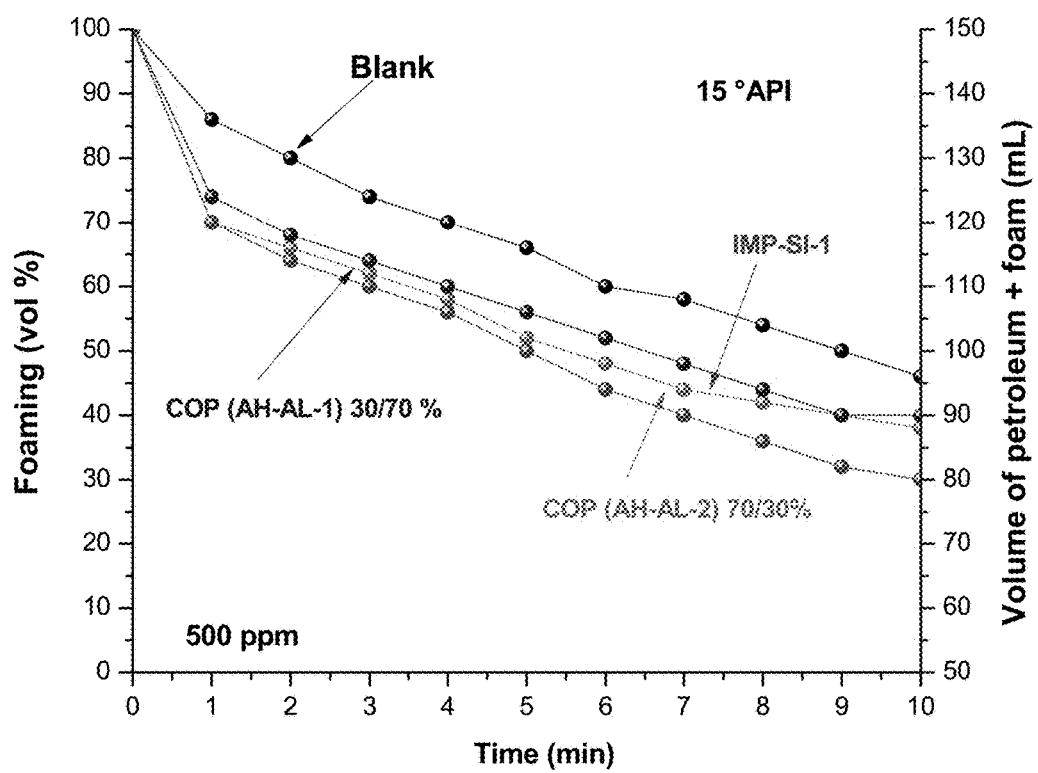

FIG. 5 shows that the Co(AH-AL)-1 and Co(AH-AL)-2 copolymers have a similar behavior as defoamers, regardless of the monomer ratio; however, both copolymers are slightly less efficient than the commercial silicone-based product IMP-SI-1. The copolymers show a defoaming efficiency of 15 vol %, relative to the blank. Both copolymers were dosed at 500 ppm.

Figure 6:
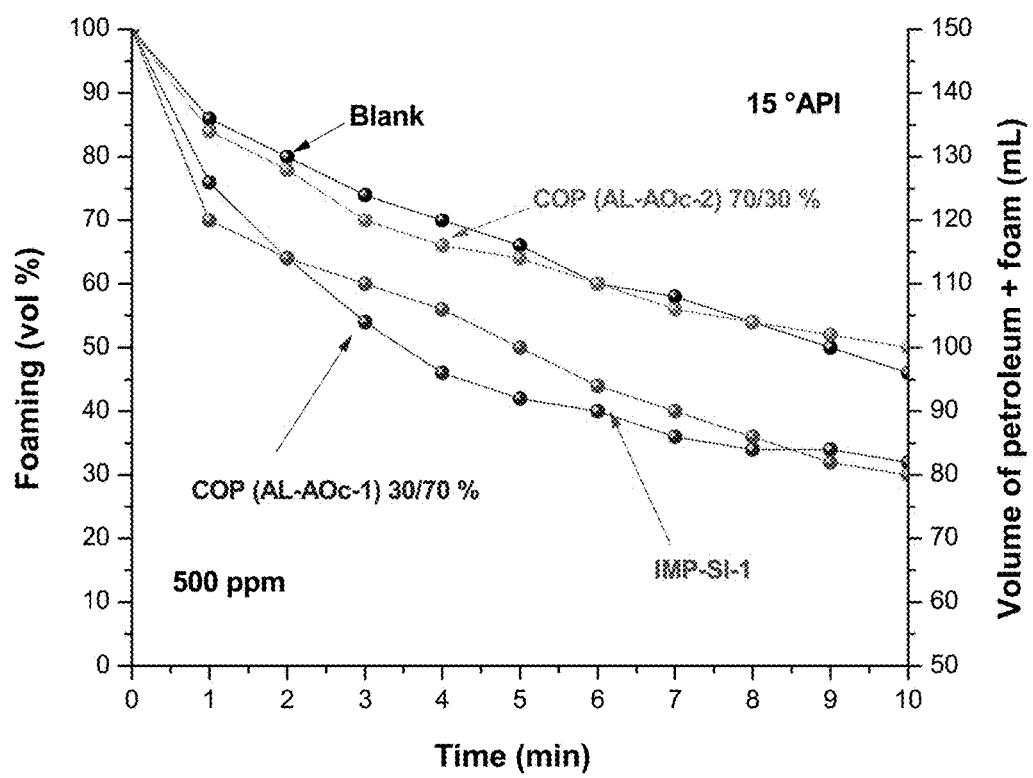

In FIG. 6, the Co(AL-AOc)-1 copolymer (AL/AOc: 30/70 wt %) shows a defoaming efficiency similar to the commercial silicone-based product IMP-SI-1 between 20 to 25 vol %, both dosed at 500 ppm. On the other hand, when monomers ratio was inverted, the Co(AL-Aoc)-2 copolymer (AL/AOc: 70/30 wt %) was not capable to abate the foam, giving the same performance than the blank.

Figure 7:
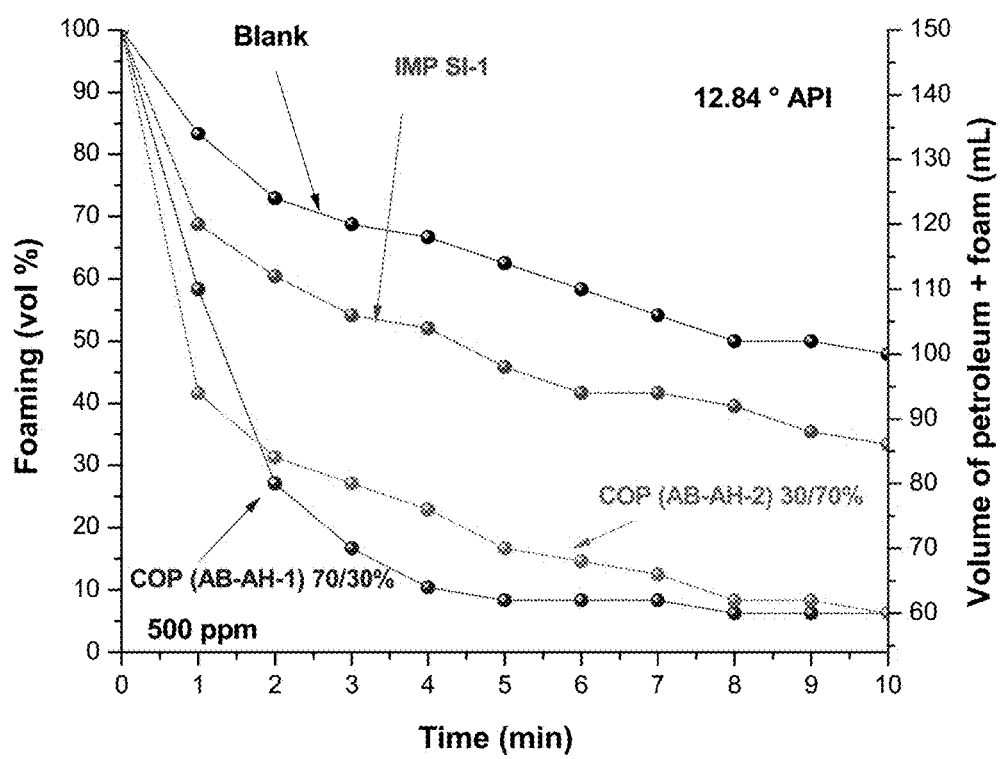
FIGS. 7 to 12 present the results of the copolymers based on alkyl acrylates evaluated in gasified super-heavy crude oil with 12.84° API.

FIG. 7 shows that the Co(AB-AH)-1 and Co(AB-AH)-2 copolymers are efficient as foam inhibitors, regardless of the proportion of AB in respect to AH, abating the foam between 40 to 50 vol % faster than the blank, even over the defoaming efficiency of the commercial silicone-based product IMP-Si-1, both dosed at 500 ppm.

Figure 8:
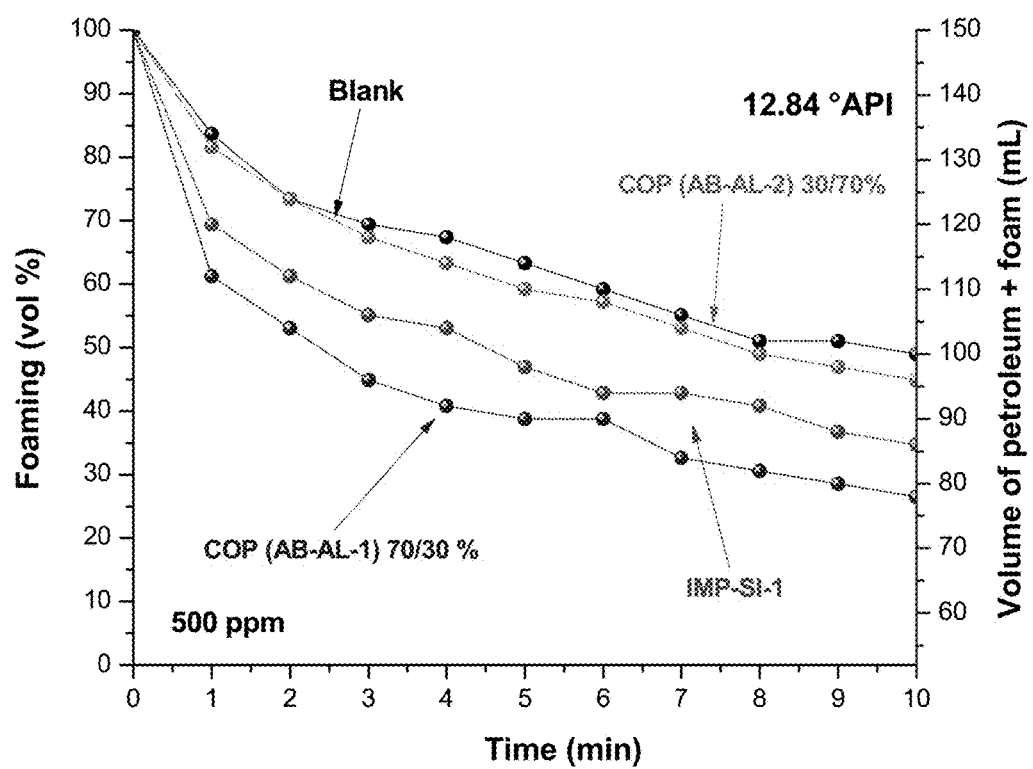

FIG. 8 shows that the Co(AB-AL)-1 copolymer (AB/AL: 70/30 wt %) is more efficient to abate the foam about 25 vol %, compared with the blank, and the copolymer is slightly better than the commercial silicone-based product IMP-SI-1. The Co(AB-AL)-2 copolymer (AB/AL: 30/70 wt %) copolymer is not able to bring down the foam, behaving like the blank. A higher amount of AB monomer (70 wt %) promotes more efficiently the foam inhibition. Both copolymers were dosed at 500 ppm.

Figure 9:
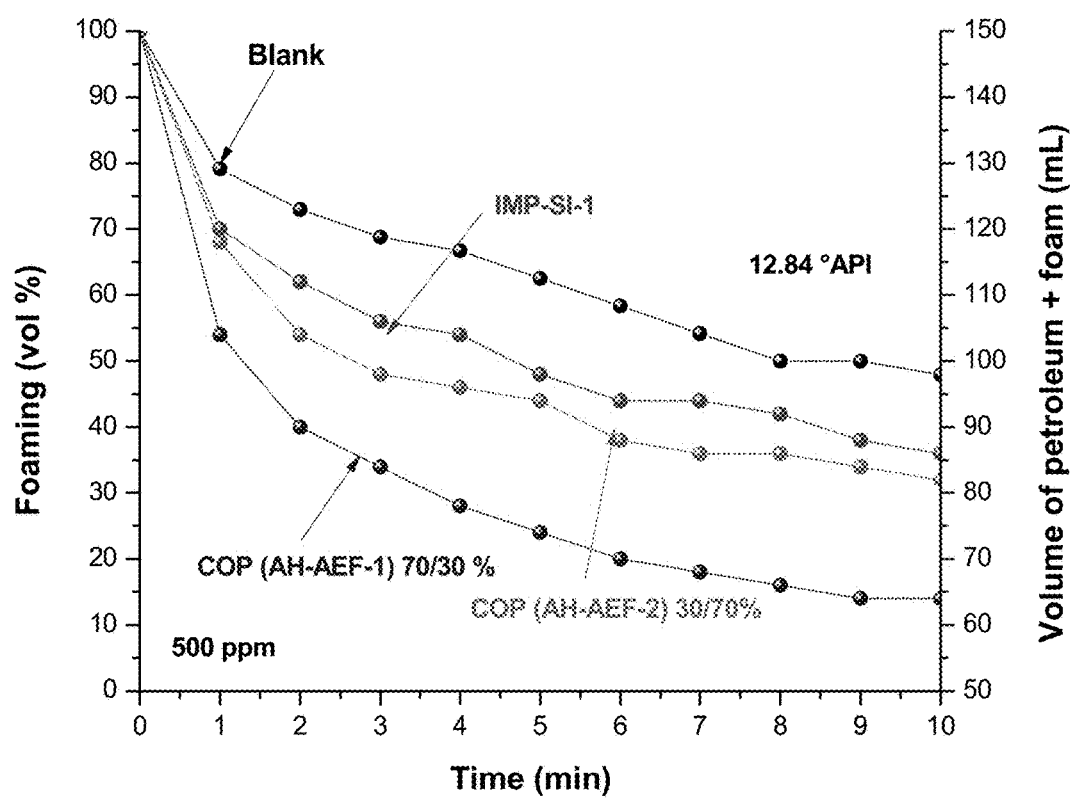

FIG. 9 shows that the Co(AH-AEF)-1 copolymer (AH/AEF: 70/30 wt %) is the most efficient as defoamer, decreasing the foam between 30 to 40 vol %, compared with the blank. The Co(AH-AEF)-2 copolymer (AH/AEF: 30/70 wt %) copolymer gives a lower efficiency as foam inhibitor, abating the foam about 20 vol %, behaving as the commercial silicone-based product IMP-SI-1. A higher amount of AH monomer improves the performance as defoamer agent.

Figure 10:
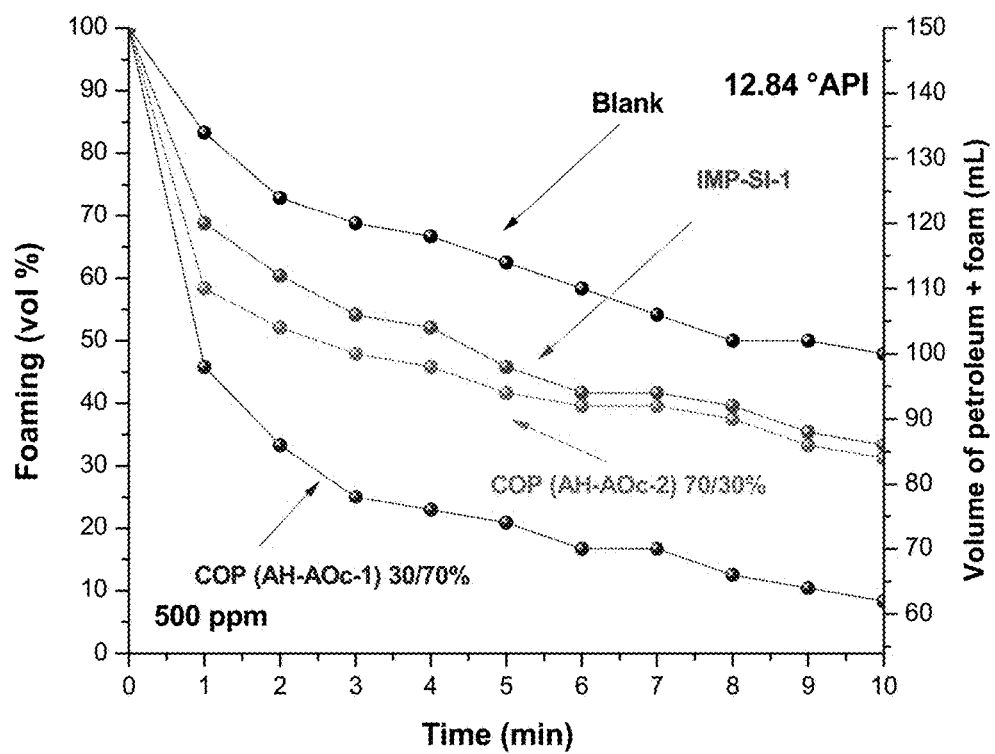

FIG. 10 shows that the Co(AH-AOc)-1 copolymer (AH-AOc: 30/70 wt %) is able to abate the foam between 30 to 40 vol % relative to the blank. The Co(AH-AOc)-2 copolymer (AH/AOc: 70/30 wt %) displays a similar behavior as the commercial silicone-based product IMP-SI-1, decreasing the foam 20 vol %. Both copolymers were dosed at 500 ppm.

Figure 11:
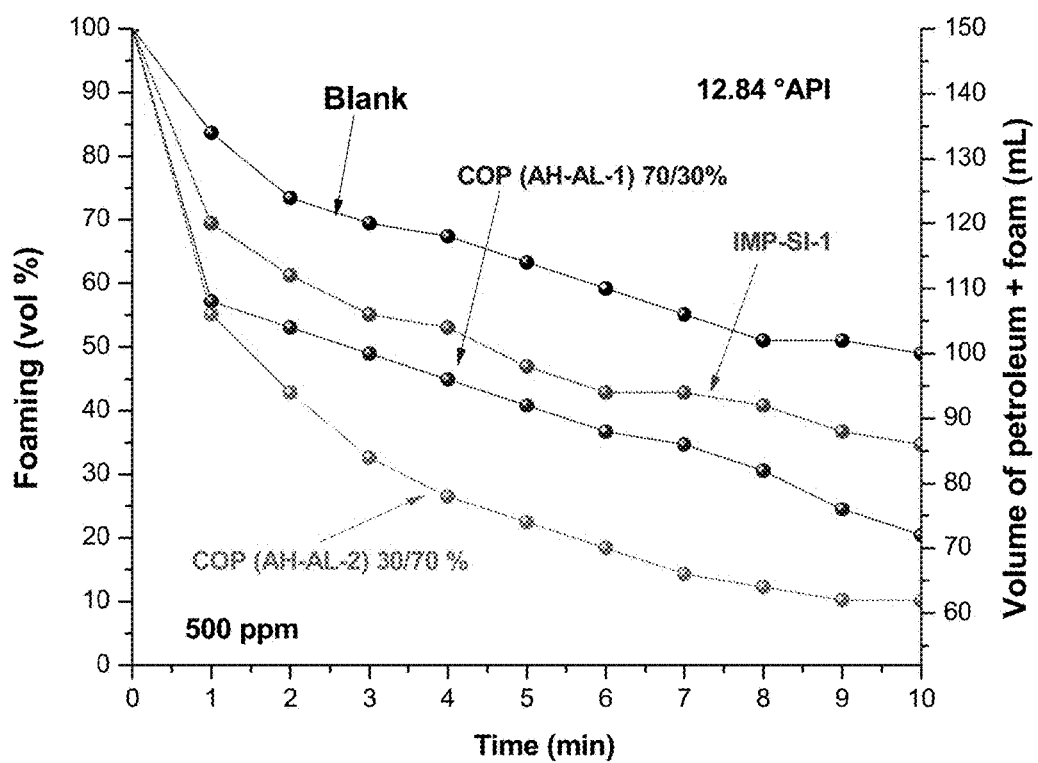

FIG. 11 shows that the Co(AH-AL)-1 copolymer (AH/AL: 30/70 wt %) and the Co(AH-AL)-2 copolymer (AH/AL 30/70 wt %) display better efficiency as defoamer than the commercial silicone-based product IMP-SI-1, where the first one gave the best performance abating the foam between 30 to 40 vol % compared with the blank; whereas the second one reached 25 vol % of defoaming efficiency relative to the blank.

Figure 12:
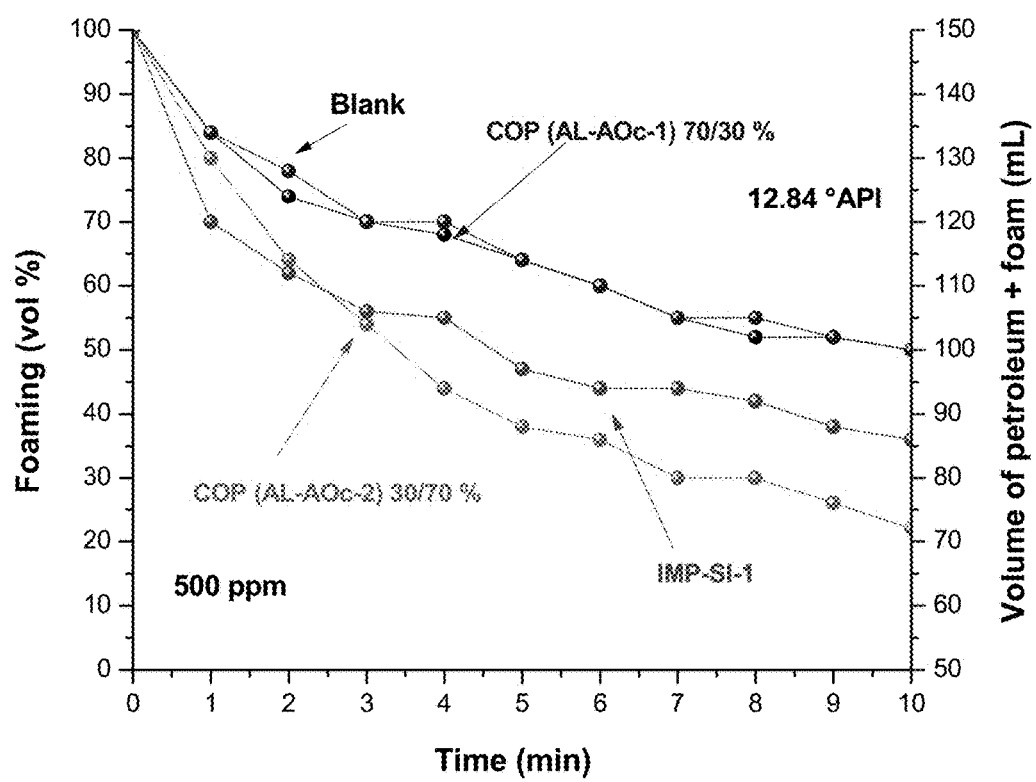

In FIG. 12, the Co(AL-Aoc)-2 copolymer (AL/AOc: 30/70 wt %) showed a similar behavior compare to the commercial silicone-based product IMP-SI-1 abating the foam 20 vol % at 3 min of the assessment, both product dosed at 500 ppm. After this period of time, the efficiency of the copolymer increases about 30% in respect to the blank. On the other hand, when monomers ratio was inverted, the Co(AL-AOc)-1 copolymer (AL/AOc: 70/30 wt %) copolymer was not capable to abate the foam, giving the same performance than the blank.

Mixtures of the formulations of acrylate copolymers based alkyl, which constitute the present invention and also mixtures formulations homopolymers acrylate based alkyl with these copolymers is evaluated, and as an example in the fact that it does not imply any limitation, performed the copolymer mixture of Co(AB-AH)-1 with Co(AL-AOC)-1. Similarly, the mixture of the Co(AB-AH)-1 copolymer with the HAH-2 homopolymer produced according to the method disclosed in Mexican patent application MX/a/2013/014352. These mixtures were evaluated as antifoam agents in gasified heavy and super-heavy crude oils (15.00 and 12.84° API), dosed at 500 ppm in both crude oils. These mixtures showed better performance as foam inhibitor compared with the blank between 15 to 40% more efficient.

The invention claimed is:

1. A process for defoaming gasified crude oil, said process comprising the step of the addition of a defoaming composition to the gasified crude oil in a degasifying apparatus and defoaming the gasified crude oil, wherein the gasified crude oil has a density of 10 to 40° API and the defoaming composition consisting of at least one copolymer of formula (1) having an average molecular weight between 1000 and 180,000 Dalton dissolved in an organic solvent and contains no water, to reduce foam formation at least 20 vol % compared with a non-dosed gasified crude oil

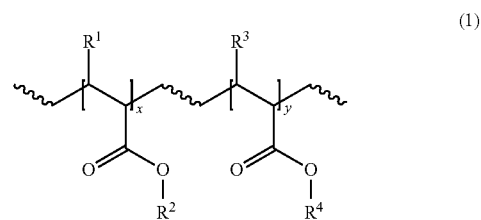

where:
$R^1$, $R^2$, $R^3$ and $R^4$ are independent radicals represented by the groups mentioned bellow:
$R^1$ and $R^3$=H (hydrogen), $CH_3$ (methyl);
$R^2$ and $R^4$ are different and independently selected from the group consisting of $CH_3$ (methyl), $C_2H_5$ (ethyl), $C_4H_9$ (n-butyl, isobutyl), $C_6H_{13}$ (n-hexyl, iso-hexyl), $C_8H_{17}$ (2 ethyl-hexyl), $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), or $C_5H_{11}O_2$ (2-(2-methoxyethoxy)ethyl), where the aliphatic chain may contain heteroatoms of the ether group, aromatic rings or rings with heteroatoms of ether type,
x=is a number between 2 and 900
y=is a number between 2 and 900 and
"x" and "y" vary randomly along the copolymer chain.

2. The process according to claim 1, where the copolymers are obtained from monomers consisting of monomers selected from the group consisting of methyl acrylate, ethyl acrylate, butyl acrylate, n-amyl acrylate, isobornyl acrylate, isobutyl acrylate, tert-butyl acrylate, hexyl acrylate, 2-ethylhexylacrylate, 3.5,5-trimethylhexyl acrylate, 2-methoxyethyl acrylate, 2-phenoxy acrylate, 4-tert-butylacyclehexyl acrylate, octyl acrylate, isodecyl acrylate, decyl acrylate, lauryl acrylate, tridecyl acrylate, octadecyl acrylate and behenyl acrylate.

3. The process according to claim 1, where the average molecular mass of copolymers vary between 7,000 and 120,000 Daltons.

4. The process according to claim 1 where an aqueous phase present during the synthesis of said copolymers is eliminated by distillation at a temperature between 80 and 120° C.

5. The process according to claim 1, where the organic solvents have a boiling point between 35 and 200° C.

6. The process according to claim 1, where the organic solvent is dichloromethane, methanol, ethanol, isopropanol, chloroform, benzene and their sub-products, toluene, xylene, turbosine and naphtha, individually or mixtures thereof.

7. The process according to claim 1, where the alkyl acrylate copolymer formulated with said solvent has a concentration between 10 and 50 wt % based on the total weight of the formulation.

8. The process according to claim 1, where the crude oil has a density of less than 20° API.

9. The process according to claim 1 where two or more copolymers based on alkyl acrylates are mixed in said formulation.

10. The process according to claim 1, where said formulations are dosed at a concentration between 10 and 2000 ppm based on the amount of crude oil.

11. The process according to claim 1, wherein x=is a number between 20 and 850, and y=is a number between 20 and 850.

12. The process according to claim 1, wherein x=is a number between 60 to 600, and y=is a number 60 to 600.

13. The process according to claim 7, wherein said formulation comprises 20 to 40 wt % of said compound of formula (1).

14. The process according to claim 10, wherein said process further comprises adding said formulation to said crude oil in an amount of 100 to 1500 ppm based on the amount of the crude oil.

15. The process according to claim 10, wherein said process further comprises adding said formulation to said crude oil in an amount of 200 to 1000 ppm based on the amount of the crude oil.

16. The process according to claim 1, wherein said crude oil has a density of 12 to 22° API.

17. The process of claim 1, wherein an aqueous phase present during synthesis of said copolymers is removed by distillation at a temperature between 90 and 110° C.

18. A process for inhibiting or reducing foam formation of heavy gasified crude oil in a degasifying apparatus, said process comprising the step of introducing an antifoaming agent composition into the separation apparatus containing gasified crude oil having a density of 10 to 40° API and defoaming or reducing foam formation by at least in 20% by volume relative to the gasified crude oil without the antifoaming agent, wherein said antifoaming agent composition comprises an alkyl acrylate copolymer of formula (1) having a molecular weight of 1,000 to 180,000 Daltons and an organic solvent

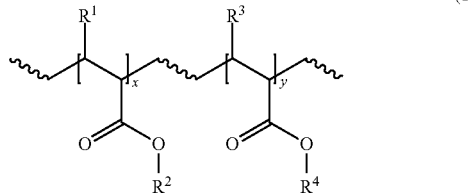

(1)

where:

$R^1$ and $R^2$ are independently selected from the group consisting of H (hydrogen) and $CH_3$ (methyl);

$R^2$ and $R^4$ are different and independently selected from the group consisting of behenyl, 2-phenoxyethyl, 2-methoxyethyl, 2-(2-methoxyethoxy)-ethyl, isobornyl, and butyl cyclohexyl; and x and y are an integer number from 2 to 900, and where said acrylate copolymer is introduced in an amount of 100 to 1500 ppm based on the amount crude oil.

19. The process of claim 18, wherein said antifoaming agent composition consists of said alkyl acrylate copolymer and a solvent.

20. The process of claim 1, wherein said copolymer is selected from the group consisting of $R^2$ is n-butyl, $R^3$ is hydrogen, and $R^4$ is n-hexyl;

$R^2$ is n-butyl, $R^3$ is hydrogen, and $R^4$ is n-lauryl;

$R^2$ is n-hexyl, $R^3$ is hydrogen, and $R^4$ is phenoxyethyl;

$R^1$ is hydrogen, $R^2$ is n-hexyl, $R^3$ is hydrogen, and $R^4$ is n-octyl;

$R^1$ is hydrogen, $R^2$ is n-hexyl, $R^3$ is hydrogen, and $R^4$ is n-lauryl; and $R^1$ is hydrogen, $R^2$ is n-lauryl, $R^3$ is hydrogen, and $R^4$ is n-octyl.

21. The process according to claim 18, wherein said copolymer of formula (1) is obtained from monomers consisting of monomers selected from the group consisting of behenyl acrylate, butyl acrylate, 2-phenoxyethyl acrylate, 2-methoxyethyl acrylate, 2-(2-methoxyethoxy)-ethyl acrylate, isobornyl, and butyl cyclohexyl acrylate.

* * * * *